United States Patent [19]

Marcinko

[11] 4,054,184
[45] Oct. 18, 1977

[54] DISPOSABLE OIL DRAIN SYSTEM AND METHOD OF USING THE SAME

[76] Inventor: Michael L. Marcinko, 1108 E. Chestnut, Santa Ana, Calif. 92705

[21] Appl. No.: 615,069

[22] Filed: Sept. 19, 1975

[51] Int. Cl.² ............................................. F16N 33/00
[52] U.S. Cl. ..................................... 184/1.5; 184/106; 141/313; 141/340
[58] Field of Search ................... 184/1.5, 106; 141/10, 141/114, 313-317, 331-337, 67, 1, 98

[56] References Cited

U.S. PATENT DOCUMENTS

| | | | |
|---|---|---|---|
| 2,073,914 | 3/1937 | Wilfley | 141/337 |
| 3,410,438 | 11/1968 | Bartz | 141/331 |
| 3,750,722 | 8/1973 | Nowak | 141/333 |
| 3,756,294 | 9/1973 | Rainey | 141/392 |

OTHER PUBLICATIONS

Popular Mechanics, June 1975, p. 36.

Primary Examiner—Houston S. Bell, Jr.
Attorney, Agent, or Firm—Knobbe, Martens, Olson, Hubbard & Bear

[57] ABSTRACT

A system for collecting and disposing of oil having a collection receptacle with a downwardly sloping bottom and a circular opening at the lower end of the bottom. Support members are attached to the sides of the receptacle to maintain a horizontal position. A tubular extention formed at the circular opening is adapted to receive a disposable plastic bag which is removably attached by an elastic fit. The disposable bag is sealed and disposed of after the oil has been captured.

3 Claims, 7 Drawing Figures

U.S. Patent  Oct. 18, 1977  Sheet 1 of 2  4,054,184
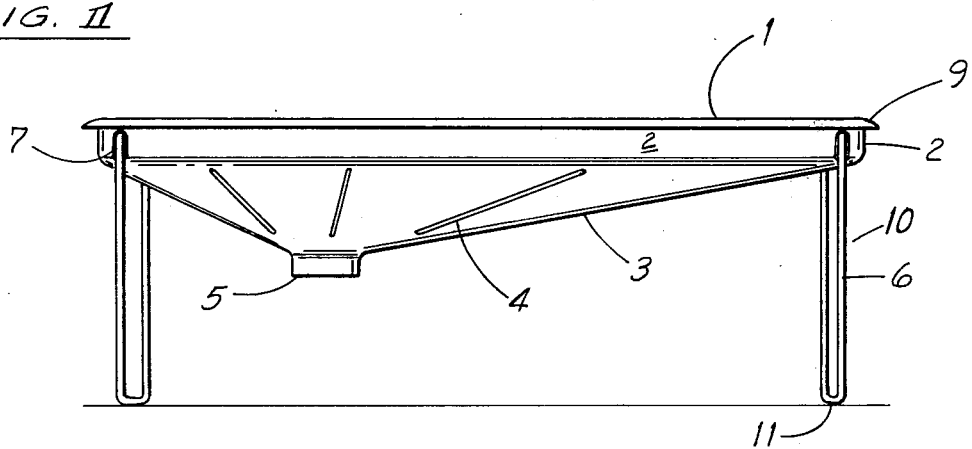
FIG. 1
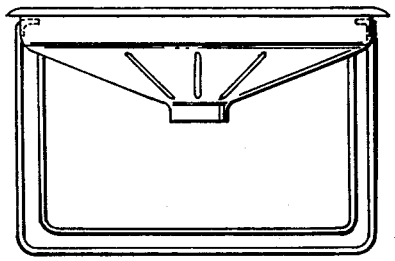
FIG. 2
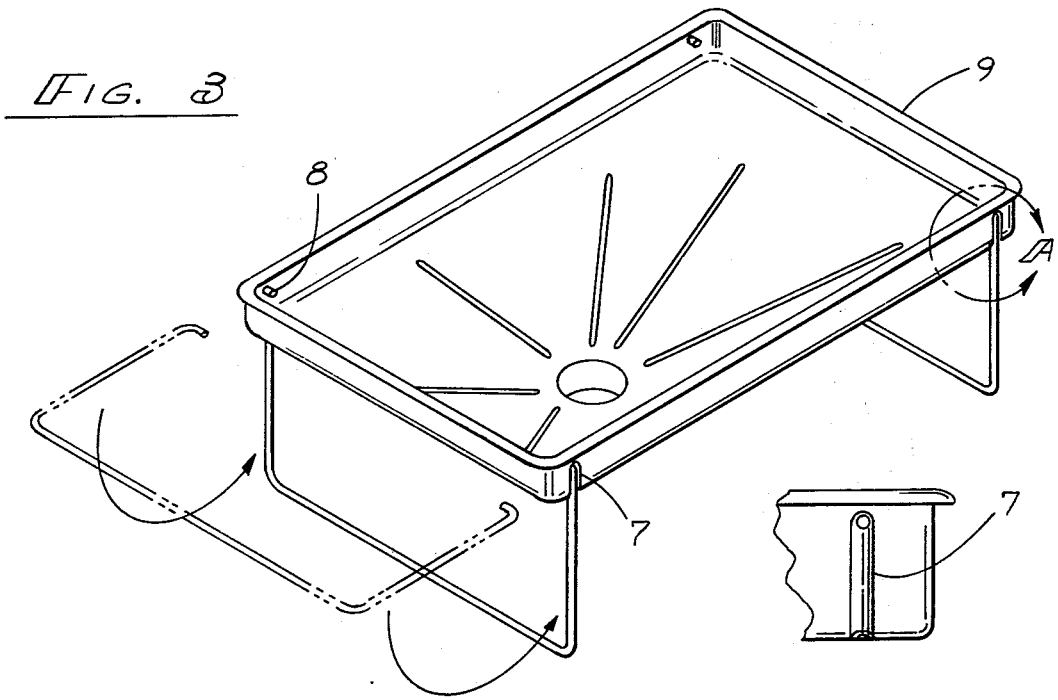
FIG. 3
FIG. 3A

DISPOSABLE OIL DRAIN SYSTEM AND METHOD OF USING THE SAME

DESCRIPTION OF THE PRIOR ART

Heretofore the crankcase oil of automobile and truck engines has been collected in upright oil collection tanks and afterwards the oil within the tank is later disposed by draining bulk oil from the tank to a dump site recycle system. Such a method dirties the enviornment and is not adaptable for ease of disposal as a do-it-yourself item.

SUMMARY OF INVENTION

This invention relates to a system for collecting and disposing of oil. More particularly, the system of this invention comprises a collecting receptacle having a downwardly sloping bottom and a circular opening at the lower end thereof and a disposable bag connected by an elastic fit to a tubular extention formed at the circular opening of the collecting receptacle.

The oil drain system is a do-it-yourself servicing item used in changing oil from an engine, such as an engine in an automobile or truck, the collecting receptacle is supported on removable side members and is placed under the engine to be drained and the disposable plastic bag is attached to the tubular spout at the bottom of the receptacle. After the oil has been collected in the disposable bag, the bag is sealed and easily disposed of.

One object of this invention is to provide a practical do-it-yourself means for draining oil from a crankcase into a collecting receptacle and then into a sealable, disposable, plastic bag in a clean manner without harming the environment through bulk disposition of the oil.

BRIEF DESCRIPTION OF THE DRAWINGS

FIG. 1 is a side view of the collecting receptacle;

FIG. 2 is a front view of the collecting receptacle;

FIG. 3 is a perspective view of the collecting receptacle showing one method of connecting the supporting members;

FIG. 3A is an enlarged view of the portion of the receptacle generally in the area of circle A in FIG. 3.

Figure 4:
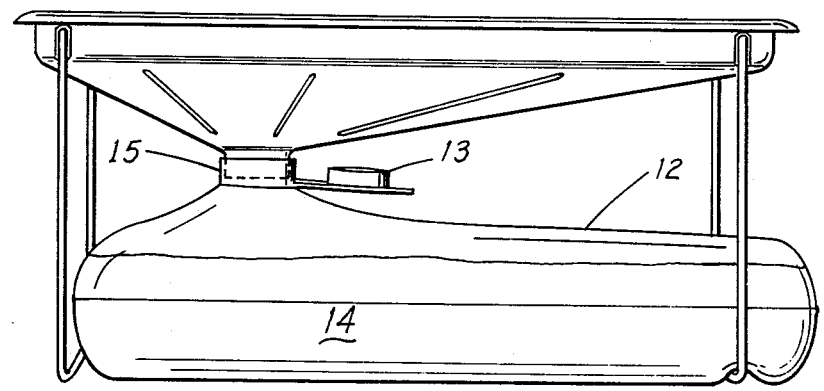
FIG. 4 is a side view of the collecting receptacle with the disposable bag attached to the tubular opening.
Figure 5:
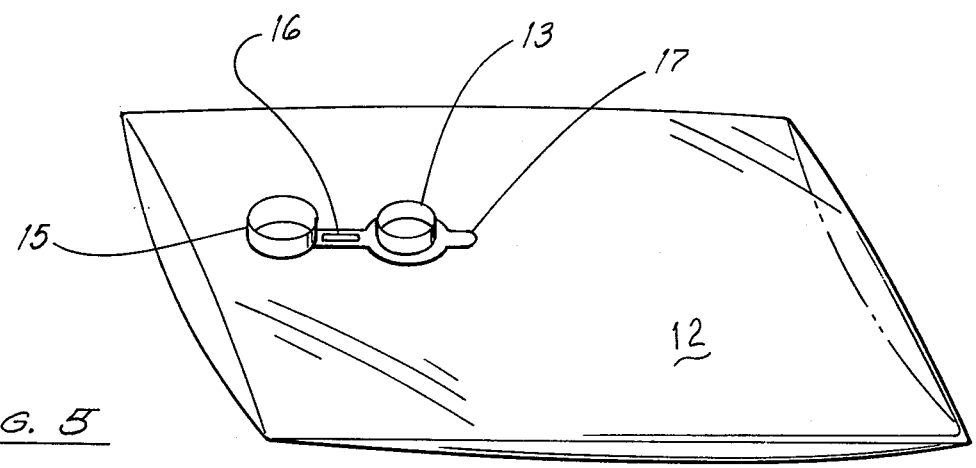
FIG. 5 is a perspective view of the disposable bag.
Figure 6:
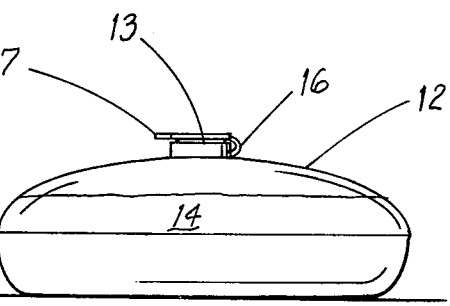
FIG. 6 is a side view of the disposable bag in a filled and sealed condition.

Referring to the drawings, there is shown in FIG. 1 the collecting receptacle of this invention indicated generally at 1. The collecting receptacle is a container formed either from material such as sheet metal, metal-plastic, metal, plastic or similar material. Collecting receptacle 1 has side walls 2, lip 9, downwardly sloping bottom 3 and tubular spout 5. The tubular spout 5 is located at the lower end of the downwardly sloping receptacle bottom 5 which is reinforced by ribs 4. Supporting members 10 are formed of spring-like metal of sides 6 and bottom 11 and are secured to collecting receptacle 1 by flexing supporting members 6 outwardly and inserting ends 8 into holes, shown in view A of FIG. 3. Also shown in view A of FIG. 3, is slotted area 7 formed in sides 2 of collecting receptacle 1 which serve to prevent supporting members from collapsing sidewardly.

Bag 12 is a high-temperature type, plastic, disposable bag commercially available which has a cap 13 secured to the spout 15 by connector 16. Tab 17 permits bag closure or opening. FIG. 4 illustrates bag 12 fitted to collecting receptacle 1 which fit is elastically secured by stretching bag spout 15 over receptacle spout 5. Liquid 14 flows from crankcase into collecting receptacle 1 and then into bag 15.

In using the oil drain system the disposable plastic bag 12 is first secured to the collecting receptacle 1 by stretching bag spout 15 over receptacle spout 5. The collecting receptacle 1 is then placed under the crankcase with bottom 11 of support members 10 in engagement with the support surface. The drain plug is removed from the crankcase allowing the oil to flow into the collecting receptacle 1. Downwardly sloping bottom 3 directs the oil to spout 5. The oil flows into disposable bag 12 through bag spout 15. After the oil has been drained from the crankcase, the disposable bag 12 is removed from collecting receptacle 1 by pulling elastically fitted bag spout 15 off of receptacle spout 5. Disposable bag 12 is then sealed by fitting cap 13 over spout 15. Tab 17 facilitates placement of cap 13 over spout 15. Cap 13 has a pressure fitting relationship with spout 15 although other closure embodiments may be used, such as a tie closure or screw cap closure. After the disposable bag has been sealed, it may be disposed of in various ways or the bags of oil may be retained for eventual recycling.

What is claimed is:

1. A device for receiving and disposing of oil drained from a motor vehicle, comprising:
   a pan having a bottom;
   a drain opening formed in said bottom;
   said entire bottom sloping to said drain opening;
   legs on said pan supporting said pan bottom above a support surface on which the motor vehicle rests;
   a disposable flexible bag of impervious material able to contain high temperature oil;
   said bag having an opening therein for receiving oil;
   means on said pan drain and said bag opening cooperating to sealingly connect together for conducting oil from said pan into the bag, said connecting means being readily unconnectable without use of any tools to remove the bag from the pan; and
   said bag being of a height relative to that of the legs such that the bag, when connected to the pan, is supported on the surface which supports the pan.

2. A device for receiving and disposing of oil drained from a motor vehicle, comprising:
   a pan having a bottom;
   a drain opening formed in said bottom;
   a spout depending from said drain opening;
   said entire bottom sloping to said drain opening;
   legs on said pan supporting said pan bottom above a support surface on which the motor vehicle rests;
   a disposable flexible bag of impervious material able to contain high temperature oil;
   said bag having an elastic opening defined therein for receiving oil;
   said spout on said pan drain being slightly larger than said elastic bag opening for accepting said elastic bag opening stretched over said spout to sealingly connect said bag to said pan for conducting oil from said pan into the bag, said elastic opening being readily connectable and unconnectable on said spout by stretching without use of any tools;
   said bag being of a height relative to that of the legs such that the bag is supported on the floor surface supporting the pan, when connected to the pan; and means for sealably closing said elastic bag opening after removal from said pan.

3. A device for receiving and disposing of oil drained from a motor vehicle, comprising:
a pan having a bottom of rigid impervious material and upright sides;
a drain formed in said bottom;
a spout depending from said drain opening;
said entire bottom sloping to said drain opening;
legs on said pan supporting said pan bottom above the floor surface on which the motor vehicle rests;
said legs being readily movable to an from an upright position supporting said pan;
said pan having means thereon engaging said legs to releasably retain them in said upright position;
a disposable flexible bag of impervious material able to contain high temperature oil;
said bag having a height substantially less than its length, but being high enough to rest on the floor when connected to the spout;
said bag having an elastic opening defined in the top thereof for receiving oil;
said spout on said pan drain being slightly larger than said elastic bag opening for accepting said elastic bag opening stretched over said spout to sealingly connect said bag to said pan for conducting oil from said pan into the bag, said elastic opening being readily connectable and unconnectable on said spout by stretching without use of any tools;
said bag being supported on the surface supporting the pan, when connected to the pan; and
means for sealably closing said elastic bag opening after removal from said pan;
said closing means being a stopper of a size slightly larger than said elastic opening, and being attached to said bag.

* * * * *